US007987051B2

(12) United States Patent
Gnanasambandam et al.

(10) Patent No.: US 7,987,051 B2
(45) Date of Patent: Jul. 26, 2011

(54) METHOD AND SYSTEM FOR DETERMINING AN AVERAGE WALK DISTANCE TO A SERVICE

(75) Inventors: Shanmuga-Nathan Gnanasambandam, Webster, NY (US); Venkatesh Guru Rao, Webster, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 479 days.

(21) Appl. No.: 12/256,215

(22) Filed: Oct. 22, 2008

(65) Prior Publication Data

US 2010/0100323 A1      Apr. 22, 2010

(51) Int. Cl.
*G06G 7/78* (2006.01)
(52) U.S. Cl. ........................................ 701/300; 705/7.11
(58) Field of Classification Search ....... 705/7; 701/300
See application file for complete search history.

(56) References Cited

U.S. PATENT DOCUMENTS

| 7,487,043 B2 * | 2/2009 | Adams | 701/300 |
| 2005/0190383 A1 * | 9/2005 | Levin et al. | 358/1.1 |

OTHER PUBLICATIONS

Rao, V.G., et al, "Encapsulated Path Planning for Abstraction-based Control of Multi-Vehicle Systems", American Controls Conference, 2006.
Jean-Claude Latombe, "Robot Motion Planning", Stanford University, Kluwer Academic Publishers, Norwell, Massachusetts, 1991.
Paco Underhill, "Why We Buy—The Science of Shopping", Simon & Schuster, New York, New York, 1999.

* cited by examiner

*Primary Examiner* — Gerald J. O'Connor
*Assistant Examiner* — Sing Phongsvirajati
(74) *Attorney, Agent, or Firm* — Pepper Hamilton LLP

(57) ABSTRACT

A system for determining an average walk distance for a plurality of users of print-related services may include a processor, a processor-readable storage medium in communication with the processor and an output device in communication with the processor. The processor-readable storage medium may include programming instructions for identifying a plurality of print-related services in a facility and identifying a total number of users associated with the plurality of services. For each identified user, the processor-readable storage medium may include programming instructions for identifying the services used by the user, determining a usage level associated with the services, determining a distance between the user and the service, determining an average walk distance for the users and displaying, on the output device, the average walk distance.

25 Claims, 9 Drawing Sheets

METHOD AND SYSTEM FOR DETERMINING AN AVERAGE WALK DISTANCE TO A SERVICE

BACKGROUND

An office, department or other similar facility may have a plurality of resources used by its employees. For example, an office may have multiple printers, scanners, fax machines and/or the like. However, resources are often located at a distance from users who frequently access them. Placing resources or users without planning can lead to inefficiencies and loss of productivity.

Methods of estimating optimal resource placement typically include collecting data regarding the walk patterns of users. For example, a distance between a user and a service may be estimated based on how long it takes the user to pickup a print job. However, this method is often inaccurate because some users may pickup a job in a delayed manner and/or forget to pickup a job. In addition such methods often utilize sensors to help determine user locations, which is costly.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In an embodiment, a system for determining an average walk distance for a plurality of users of print-related services may include a processor, a processor-readable storage medium in communication with the processor and an output device in communication with the processor. The processor-readable storage medium may include one or more programming instructions for identifying a plurality of print-related services in a facility, where each service may be provided by one or more resources and identifying a total number of users associated with the plurality of services. For each identified user, the processor-readable storage medium may include one or more programming instructions for identifying one or more of the services used by the identified user, and for each identified service, determining a usage level associated with the identified service and the identified user, determining a distance between the identified user and the identified service, determining a first value by multiplying the usage level by the distance and determining a second value by summing the first values associated with each identified service. The processor-readable storage medium may include one or more programming instructions for determining a third value by summing the second values associated with each identified user, determining an average walk distance for the one or more identified users by dividing the third value by the total number of identified users and displaying, on the output device, the average walk distance.

In an embodiment, a method of determining an average walk distance for a user may include identifying a plurality of services in a facility, where each service may be provided by one or more resources, identifying a user associated with the plurality of services and identifying one or more services used by the identified user. For each identified service, the method may include determining a usage level associated with the identified service and the identified user, determining, by a computing device, a distance between the identified user and the identified service, and determining a first value by multiplying the usage level by the distance. An average walk distance may be determined by summing the first values associated with each identified service and the average walk distance may be displayed.

In an embodiment, a method of determining an average walk distance for a plurality of users may include identifying a plurality of services in a facility, where each service may be provided by one or more resources and identifying a total number of users associated with the plurality of services. For each identified user, the method may include identifying one or more services used by the identified user, and, for each identified service, determining a usage level associated with the identified service and the identified user, determining, by a computing device, a distance between the identified user and the identified service and determining a first value by multiplying the usage level by the distance. A second value may be determined by summing the first values associated with each identified service. A third value may be determined by summing the second values associated with each identified user. An average walk distance may be determined for the one or more users by dividing the third value by the total number of users. The average walk distance may be displayed.

BRIEF DESCRIPTION OF THE DRAWINGS

Aspects, features, benefits and advantages of the present invention will be apparent with regard to the following description and accompanying drawings, of which.

DETAILED DESCRIPTION

For purposes of the discussion below, a "resource" refers to a device that performs a processing function. For example, in an office environment, a resource may include a document production resource such as a printer, a copier, a binder, a hole-punch, a collator, a sealer, a multi-function device and/or any other similar processing equipment. Exemplary resources may also include medical equipment, such as medical imaging equipment, surgical equipment and/or the like. In addition, resources may include factory equipment and other mechanical equipment.

A "service" is an atomic functionality of a resource. Exemplary print-related services may include print, color/monochrome print, scan, email, network scan and/or the like. Exemplary medical-related services may include x-ray, cat scan and/or the like. Exemplary factory-related services may include bottling, sealing, filling and/or the like.

An "average walk distance" is the average distance that a user of a particular type of service travels to access the service.

A "facility" is one or more structures such as an office, a warehouse, a factory, a hospital, a building, one or more floors in a building, an area in a building and/or the like.

A "vertical movement system" is a mechanism that facilitates the movement of people, freight and/or the like between floors of a facility. Exemplary vertical movement systems may include stairs, elevators, escalators, ramps, hydraulic lifts and/or the like.

Figure 1:
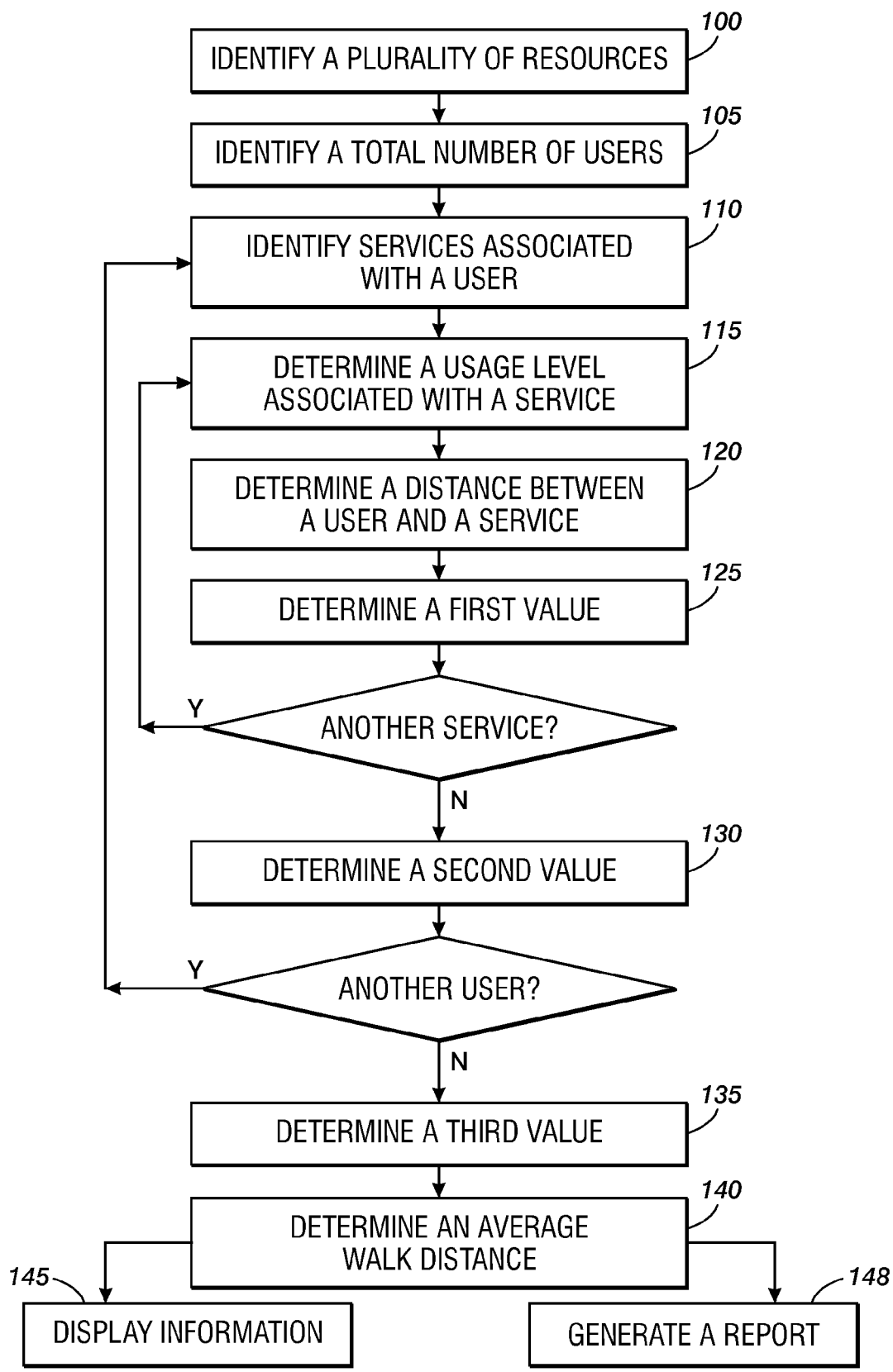
FIG. 1 illustrates an exemplary method of determining an average walk distance according to an embodiment.

FIG. 1 illustrates an exemplary method of determining an average walk distance ("AWD") for a fleet of resources. In an embodiment, each resource may provide one or more services. A service may be a print-related service such as copying, printing, scanning, faxing and/or the like. In an embodiment, an average walk distance may be the average distance that a user of a particular type of service travels to access a service. For example, the average walk distance to any printer in a building may be 102 feet per day.

In an embodiment, an average walk distance may be represented by the following:

$$AWD = \frac{1}{N}\sum_{i=1}^{N}\sum_{j=1}^{|M_i|} p_{ij}(T)d_{ij}$$

where N=the number of users of a fleet of resources;
$M_i$=a set of services of a particular type;
$p_{ij}(T)$=a projected usage level of the $i^{th}$ user on the $j^{th}$ service for a time T;
$d_{ij}$=a distance between the $i^{th}$ user and the $j^{th}$ service.

In an embodiment, an average walk distance may be determined by identifying 100 a plurality of resources in a facility. In an embodiment, a total number of users associated with the plurality of resources may be identified 105. For example, in an office, the total number of users may be the total number of employees. In an embodiment, the total number of users may be the total number of users in at least a portion of the facility. For example, the total number of users may be the total number of users on a floor, in a building wing, in a department and/or the like.

In an embodiment, one or more services may be identified 110 for each user. The identified services may be those used by the user. For example, a first user may use copying and printing services, while a second user may use scanning and printing services.

Figure 2:
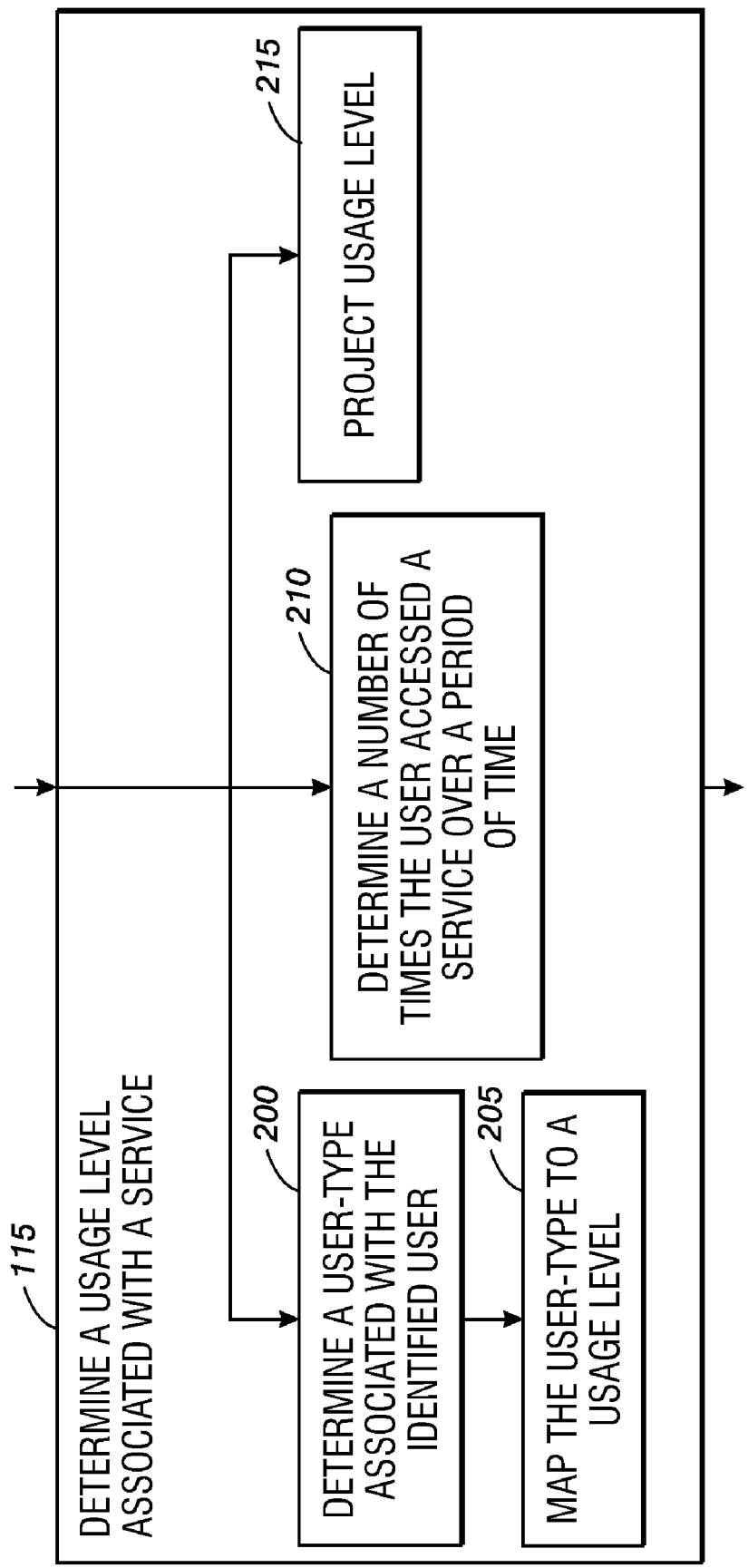
FIG. 2 illustrates exemplary methods of determining a usage level according to an embodiment.

In an embodiment, a usage level may be determined 115 for each identified service. FIG. 2 illustrates exemplary methods of determining 115 a usage level according to an embodiment. A usage level may indicate how frequently a user uses a service. In an embodiment, a usage level may be determined 115 by determining 200 a user-type associated with the user. A user-type may be a category to which the user belongs. In an embodiment, a user-type may be based on the user's job type, job responsibilities, department and/or the like. For example, exemplary user-types in an organization may include marketing and sales, software testing and software development. In an embodiment, the determined user-type may be mapped 205 to a usage level. For example, each department may have a corresponding usage level, such as low, medium and high. As an example, a user belonging to the marketing and sales department may have high usage levels associated with printing and copying, while a user belonging to the software testing department may have low usage levels associated with these services. Table 1 illustrates exemplary usage levels for exemplary user-types according to an embodiment.

TABLE 1

|  | Printing | Copying | Scanning | Emailing |
| --- | --- | --- | --- | --- |
| Marketing and Sales | High | High | High | High |
| Software Testing | Low | Low | Low | Medium |
| Software Development | Medium | Medium | Medium | Medium |

In an embodiment, a usage level may correspond to a numeric value. For example, a high usage level may correspond to a value of 3.0, a medium usage level may correspond to a value of 2.0 and a low usage level may correspond to a value of 1.0.

In an embodiment, a usage level may be determined 115 by projecting 215 a usage level for a service. For example, a usage level may be projected 215 for a user and a service based on historical data associated with the user, a service and/or a user type, actual usage data associated with the user and/or service and/or the like. In an embodiment, a usage level may be projected 215 automatically by a computing device or the like. Alternatively, a user may provide a projected usage level.

In an embodiment, a usage level may be determined 115 by determining 210 actual measurements of usage over a period of time. For example, a usage level for a printing service may be determined 115 by counting the number of times that a user printed over a certain time period, such as, for example, a week. In an embodiment, a resource associated with a service may track how often that service is used by a particular user. For example, a user may be required to provide an identifier in order to access a service. The resource may store information regarding service usage for the user. In an embodiment, usage information may be sent from a resource to a computing device.

Figure 3:
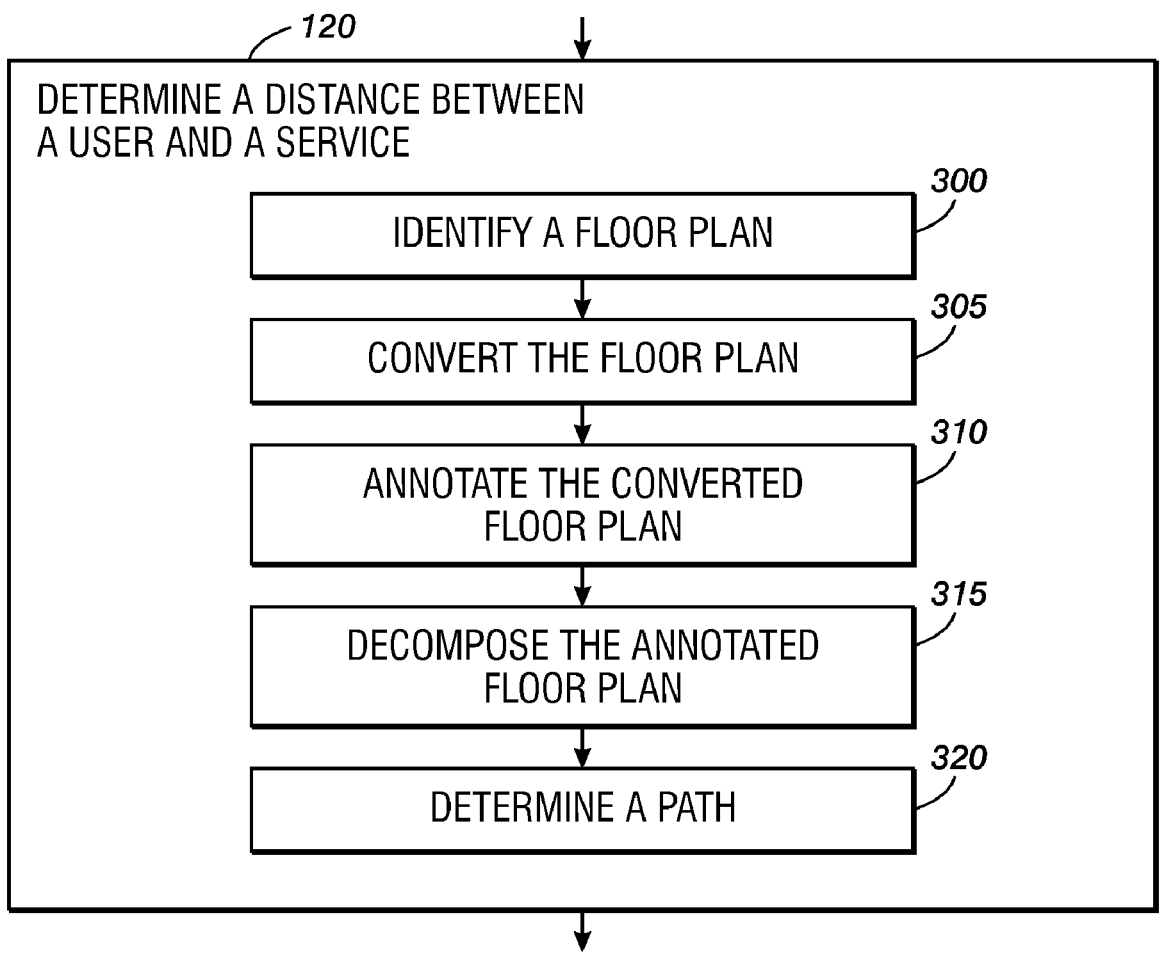
FIG. 3 illustrates an exemplary method of determining a distance according to an embodiment.
Figure 5:
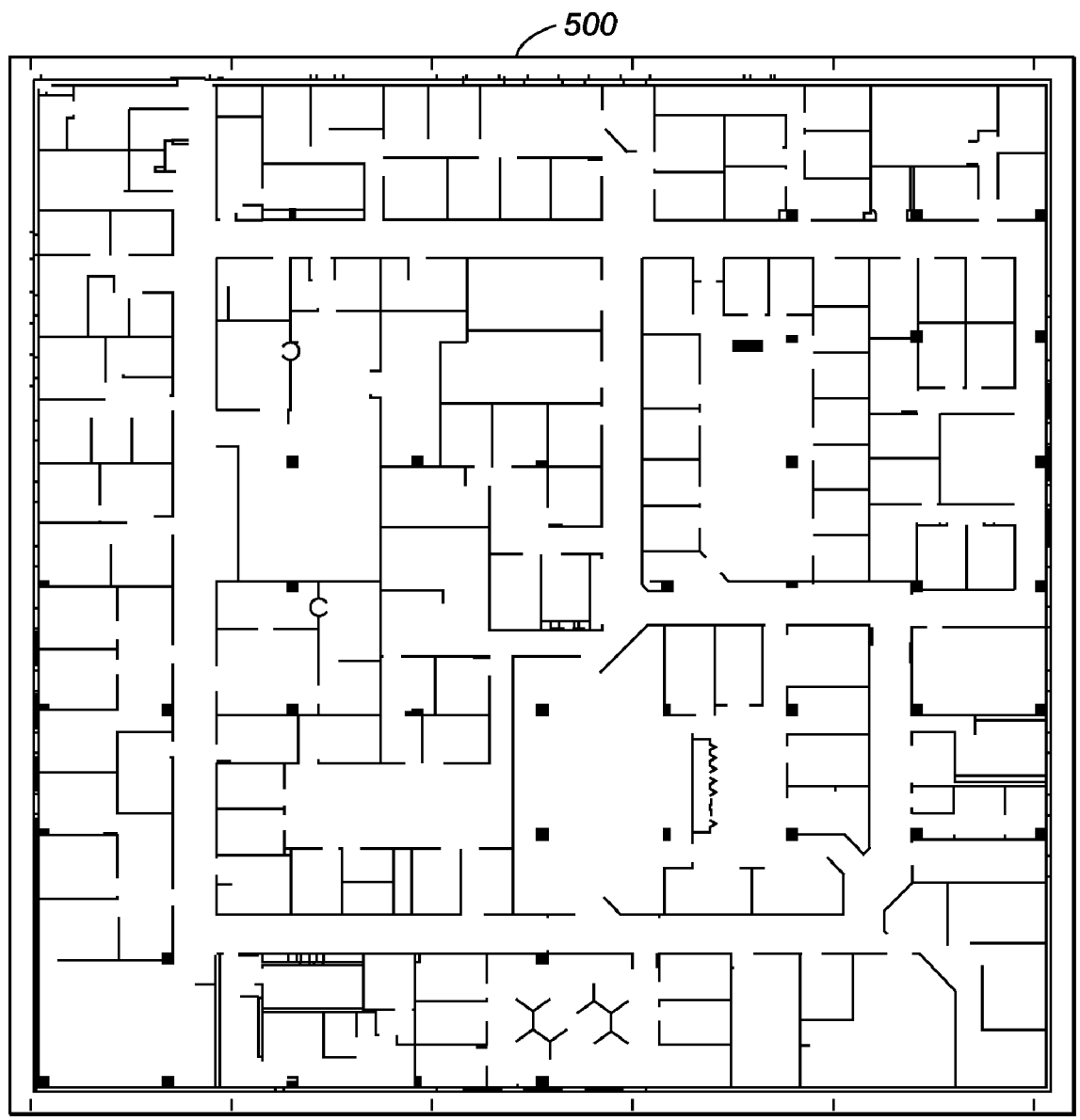
FIG. 5 illustrates an exemplary floor plan according to an embodiment.

In an embodiment, a distance between a user and a service may be determined 120 for each identified service. FIG. 3 illustrates an exemplary method of determining 120 a distance according to an embodiment. The distance may be an estimate of a shortest walk-distance between the user and a service. In an embodiment, a floor-plan associated with an area may be identified 300. The floor plan may be a single-floor floor plan, a multi-floor floor plan and/or the like. FIG. 5 illustrates an exemplary floor plan 500 according to an embodiment.

In an embodiment, the floor plan may be converted 305 to a digital format, such as to a jpg file, a bmp file and/or the like. The floor plan may be converted 305 to distinguish traversable areas, such as hallways, corridors, lobbies and the like from obstacles, such as doors, walls, furniture and/or the like.

In an embodiment, annotations may be made 310 to the converted floor plan. The annotations may correlate position coordinates with building specific attributes such as, for example, room numbers, exits, doors, stairs, elevators, safe zones, service locations and/or resource locations. In an embodiment, building specific attributes may be stored in, for example, a database to facilitate automated searching. In an embodiment, a lightweight directory access protocol ("LDAP") may be used to correlate information, such as user names, room numbers, office locations, workspace locations and/or the like.

Figure 4:
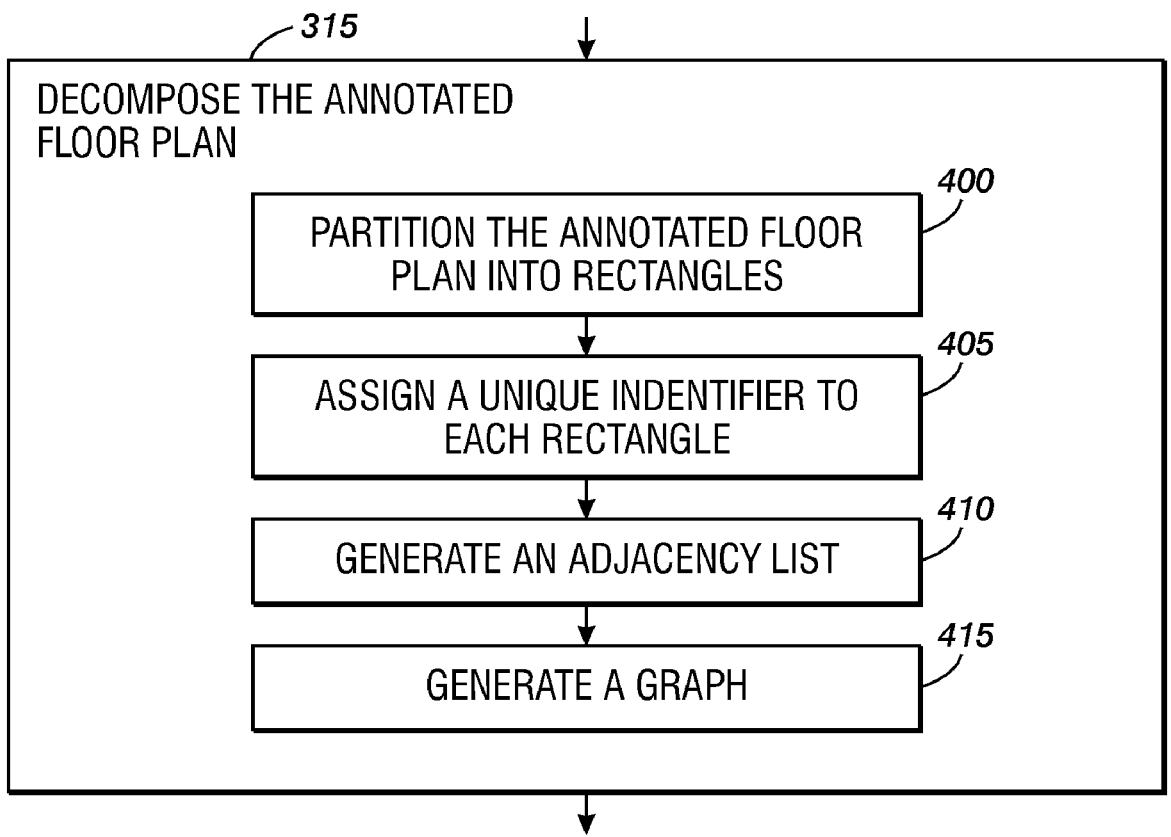
FIG. 4 illustrates an exemplary method of decomposing a floor plan according to an embodiment.

In an embodiment, the converted floor plan may be decomposed 315. FIG. 4 illustrates an exemplary method of decomposing 315 a floor plan according to an embodiment. In an embodiment, at least a portion of an area of the converted floor plan may be partitioned 400 into one or more rectangles. Each rectangle may be assigned 405 a unique identifier and/or one or more position coordinates. In an embodiment, the rectangles may not be uniformly sized.

In an embodiment, an adjacency list may be generated 410 for each rectangle. The adjacency list may include, for one or more rectangles, position coordinates, a unique identifier and/or other similar information associated with one or more adjacent rectangles.

Figure 6:
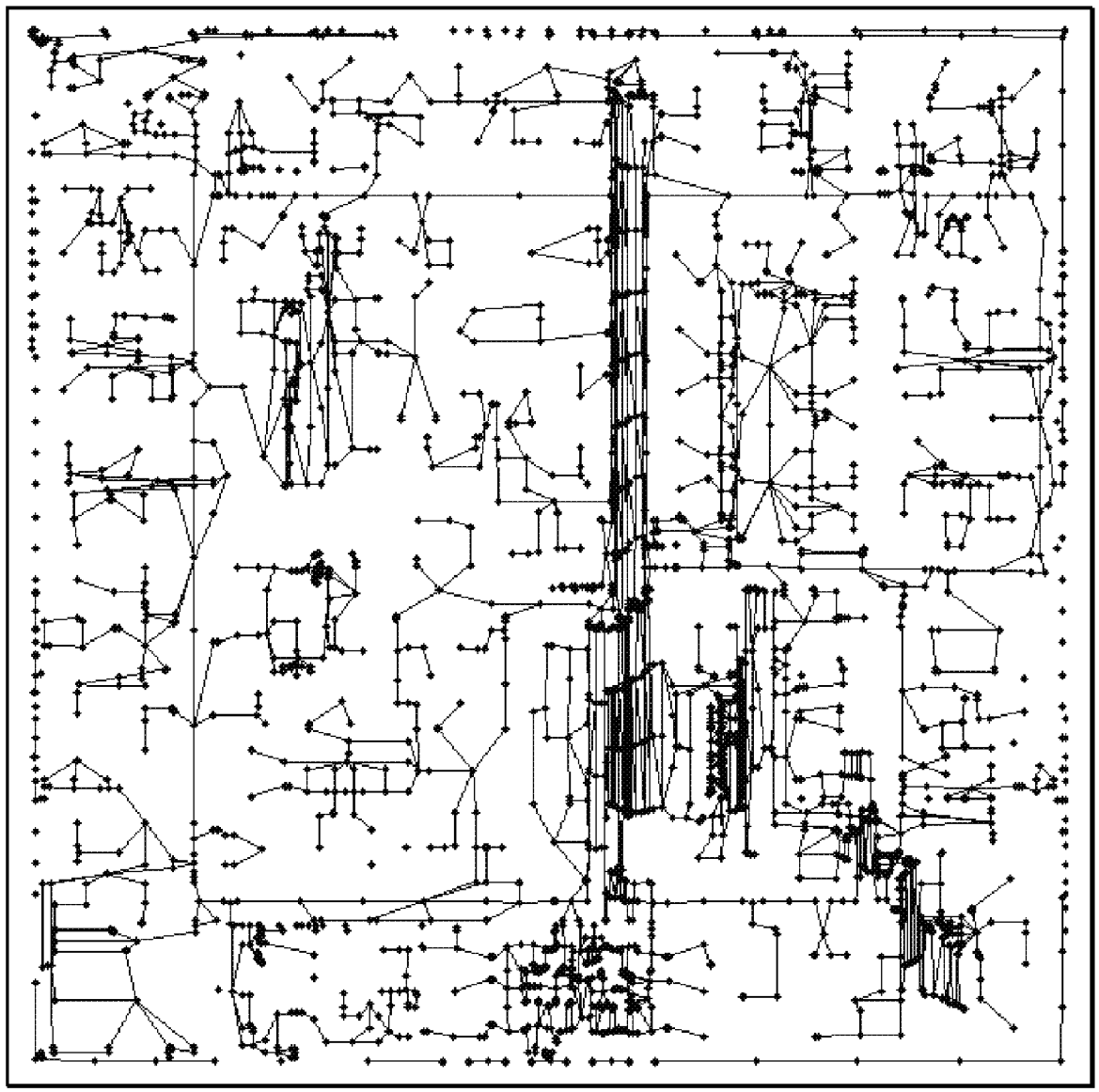
FIG. 6 illustrates an exemplary graph corresponding to an exemplary floor plan according to an embodiment.

In an embodiment, the adjacency list may be used to generate 415 a graph. The graph may have one or more vertices and one or more edges. In an embodiment, each vertex may correspond to a rectangle and may have one or more associated edges. In an embodiment, each edge associated with a vertex may correspond to a rectangle that is adjacent to the rectangle represented by the vertex. FIG. 6 illustrates an exemplary graph corresponding to the exemplary floor plan depicted in FIG. 5.

In an embodiment, a distance between an identified user and an identified service may be determined 320. In an embodiment, the distance may be the shortest distance between an identified service and an identified user. Alternatively, the distance may not be the shortest distance between an identified user and an identified service. For example, the shortest distance between an identified user and an identified service may include a hallway that is currently under construction. As such, the identified user may need to traverse a route to the identified service that is not representative of the shortest distance between the user and the service.

The distance may be determined 320 using the generated graph. For example, an algorithm may be used to determine a distance between the identified user and the identified service. In an embodiment, a distance between an identified user and an identified service may be based on the user-type associated with the identified user. For example, those users who are part of the marketing and sales department may walk further to a particular printer than users who are part of the software development department.

Figure 7:
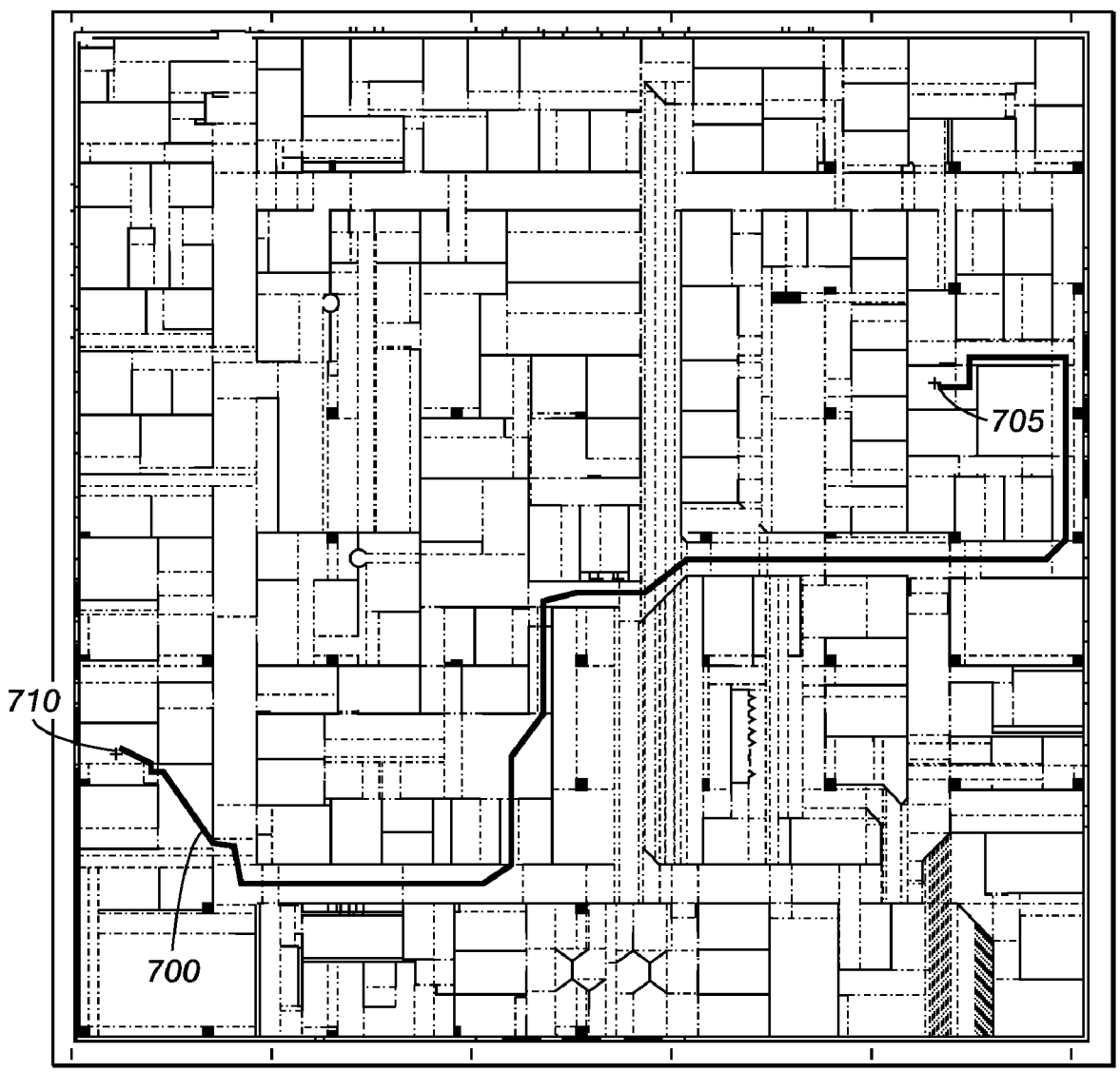
FIG. 7 illustrates an exemplary shortest path between an identified user and an identified service according to an embodiment.

In an embodiment, a shortest-path algorithm may be used to determine a shortest distance between the identified user and the identified service. Exemplary shortest-path algorithms include the Dijkstra algorithm, the A* algorithm, the Bellman-Ford algorithm and/or the like. FIG. 7 illustrates an exemplary shortest path 700 between an identified user 705 and an identified service 710 using the A* algorithm.

In an embodiment, a shortest distance may be determined between an identified user located on a first floor and an identified service located on a second floor. In an embodiment, two or more floors may be connected by a vertical movement system, such as an elevator, a stairwell, an escalator, a ramp, a hydraulic lift and/or the like. The shortest distance between an identified user, located on one floor, and an identified service that is located on a different floor may be represented by the following:

$$\text{Distance}(A(z1),B(z2))=\text{Distance}(A(z1),X(z1))+\text{Distance}(X(z1),X(z2))+\text{Distance}(X(z2),B(z2))$$

Where: $z1$=the z coordinate for an identified user, A;
$z2$=the z coordinate for an identified service, B;
$X(z1)$=the z coordinate of the vertical movement system on the same floor as A; and
$X(z2)$=the z coordinate of the vertical movement system of the same floor as B.

Figure 8:
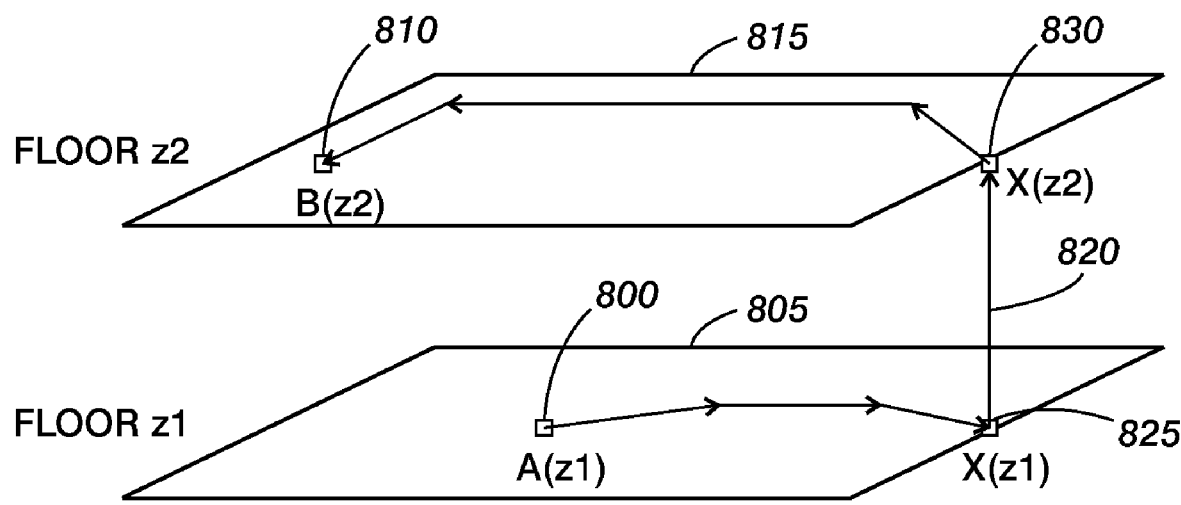
FIG. 8 illustrates an exemplary floor diagram according to an embodiment.

FIG. 8 illustrates an exemplary diagram of a user 800 located on floor z1 805 and a service 810 located on floor z2 815. As illustrated by FIG. 5, floor z1 805 and floor z2 815 are connected by a vertical movement system, X 820. The location of an entrance to X 820 on floor z1 805 is represented by X(z1) 825, and the location of an entrance to X on floor z2 815 is represented by X(z2) 830. As such, the shortest distance between an identified user, A(z1) 800, and an identified service, B(z2) 810, may be the sum of the shortest distance between the identified user and the entrance 825 to the vertical movement system 820 on floor z1 805, the shortest distance between the entrance to the vertical movement system on floor z1 and the entrance 830 to the vertical movement system on floor z2 815, and the shortest distance between the entrance to the vertical movement system on floor z2 and the identified service. Although two floors are used in this example, it is understood that an average walk distance may be determined across more, fewer, alternate and additional floors within the scope of this disclosure. In addition, an average walk distance may be determined across a plurality of buildings in a manner similar to that described above.

In an embodiment, a first value may be determined 125 for each user-service pair. A first value may be determined 125 by multiplying the determined usage level associated with a user-service pair by the determined distance between the user and the service.

In an embodiment, a second value may be determined 130. A second value may be determined 130 for each identified user by summing the first values associated with each identified service corresponding to the user. In an embodiment, a third value may be determined 135. A third value may be determined 135 by summing the second values associated with each user. In an embodiment, an average walk distance may be determined 140 by dividing the third value by the total number of users.

In an embodiment, information associated with the average walk distance may be displayed 145 to a user. For example, the total number of users, resources, resource locations, services, usage levels, distances between users and services, floor plans, a representation of the shortest distance between a user and a resource and/or the like may be displayed 145.

In an embodiment, a report may be generated 148. The report may include one or more of the total number of users, resources, resource locations, services, usage levels, distances between users and services, floor plans, and a representation of the shortest distance between a user and a resource. In an embodiment, the report may be printed, faxed, emailed, scanned and/or the like.

In an embodiment, an average walk distance may be determined for one or more service types. For example, an average walk distance may be determined for faxing, for printing, for emailing and/or the like. The determined average walk distances may be used to optimize locations of resources offering those services. For example, an average walk distance may be used to determine an optimal number of resources and an optimal placement for those resources.

Figure 9:
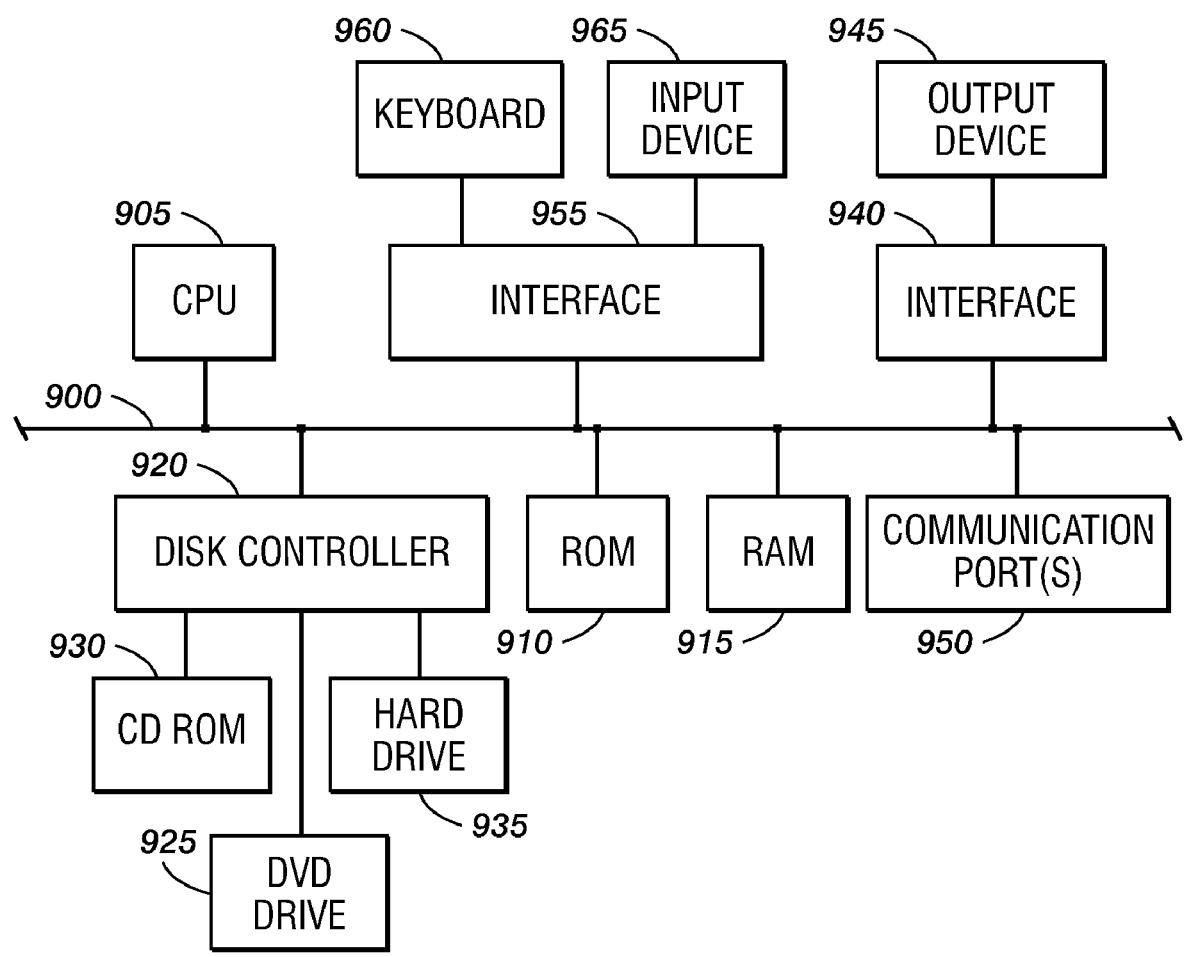
FIG. 9 depicts a block diagram of exemplary internal hardware that may be used to contain or implement the program instructions according to an embodiment.

FIG. 9 depicts a block diagram of exemplary internal hardware that may be used to contain or implement the program instructions according to an embodiment. A bus 900 serves as the main information highway interconnecting the other illustrated components of the hardware. CPU 905 is the central processing unit of the system, performing calculations and logic operations required to execute a program. Read only memory (ROM) 910 and random access memory (RAM) 915 constitute exemplary memory devices.

A disk controller 920 interfaces with one or more optional disk drives to the system bus 900. These disk drives may include, for example, external or internal DVD drives 925, CD ROM drives 930 or hard drives 935. As indicated previously, these various disk drives and disk controllers are optional devices.

Program instructions may be stored in the ROM 910 and/or the RAM 915. Optionally, program instructions may be stored on a tangible computer readable medium such as a compact disk or a digital disk or other recording medium.

An optional interface 940 may permit information from the bus 900 to be transmitted to an output device 945. For example, the interface 940 may permit information from the bus 900 to be displayed on a display in audio, graphic or alphanumeric format. In an embodiment, the interface 940 may permit information from the bus 900 to be printed by a printing device. Additional and/or alternate output devices may be used within the scope of this disclosure. Communication with external devices may occur using various communication ports 950. An exemplary communication port 950 may be attached to a communications network, such as the Internet or an intranet.

In an embodiment, the hardware may include an interface 955 which allows for receipt of data from input devices such as a keyboard 960 or other input device 965 such as a mouse, a touch screen, a remote control, a pointer and/or a joystick.

An embedded system, such as a sub-system within a xerographic apparatus, may optionally be used to perform one, some or all of the operations described herein. Likewise, a multiprocessor system may optionally be used to perform one, some or all of the operations described herein.

Although the disclosed embodiments pertain to determining an average walk distance to print resources, the disclosed methods and systems can be applied to determining an average walk distance to resources in general in other environments, such as a hospital, a mechanic shop, a factory and/or the like.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for determining an average walk distance for a plurality of users of print-related services, the system comprising:
    a processor;
    a processor-readable storage medium in communication with the processor; and
    an output device in communication with the processor,
    wherein the processor-readable storage medium comprises one or more programming instructions, that when executed causes the processor to:
        identifying a plurality of print-related services in a facility, wherein each service is provided by one or more resources;
        identifying a total number of users associated with the plurality of services;
        for each identified user:
            identifying one or more of the services used by the identified user, for each identified service:
                determining a usage level associated with the identified service and the identified user,
                determining a distance between the identified user and the identified service,
                determining a first value by multiplying the usage level by the distance; and
                determining a second value by summing the first values associated with each identified service;
            determining a third value by summing the second values associated with each identified user;
            determining an average walk distance for the one or more identified users by dividing the third value by the total number of identified users; and
            displaying, on the output device, the average walk distance.

2. The system of claim 1, wherein the one or more programming instructions for determining a usage level comprise one or more programming instructions for:
    determining a user-type associated with the identified user; and
    assigning a usage level to the identified user based on the user-type associated with the identified user.

3. The system of claim 1, wherein the one or more programming instructions for determining a usage level comprise one or more programming instructions for:
    determining a number of times the identified user accessed the identified service over a period of time.

4. The system of claim 1, wherein the one or more programming instructions for determining a usage level comprise one or more programming instructions for projecting the usage level based on one or more of the following:
    historical data associated with a user type corresponding to the identified user; and
    usage data associated with the identified user and the identified service.

5. The system of claim 1, wherein the one or more programming instructions for determining a distance between the identified user and the identified service comprises one or more programming instructions for:
    identifying a floor plan associated with the building;
    converting the floor plan to a digital format;
    annotating the converted floor plan to produce an annotated floor plan;
    decomposing the annotated floor plan to produce a graph; and
    determining a path between the identified user and the identified service using the graph.

6. The system of claim 5, wherein the one or more programming instructions for annotating the converted floor plan comprises one or more programming instructions for correlating a set of position coordinates associated with the converted floor plan to one or more of the following:
    a room number;
    an exit;
    a stairwell;
    an elevator; and
    a location associated with a resource.

7. The system of claim 5, wherein the one or more programming instructions for decomposing the annotated floor plan comprises one or more programming instructions for:
    partitioning the annotated floor plan into a plurality of rectangles, wherein the plurality of rectangles are not uniformly sized, wherein each rectangle in the plurality is associated with one or more position coordinates;

generating an adjacency list by determining one or more adjacent rectangles to each rectangle in the plurality; and generating a graph based on the adjacency list, wherein the graph comprises a plurality of vertices and a plurality of edges.

8. The system of claim 7, wherein the one or more programming instructions for determining a path comprises one or more programming instructions for using the generated graph to determine the shortest path between the identified user and the identified service.

9. A method of determining an average walk distance for a user, the method comprising:

identifying a plurality of services in a facility, wherein each service is provided by one or more resources;

identifying a user associated with the plurality of services;

identifying one or more services used by the identified user;

for each identified service:
determining a usage level associated with the identified service and the identified user,
determining, by a computing device, a distance between the identified user and the identified service, and
determining a first value by multiplying the usage level by the distance;

determining an average walk distance by summing the first values associated with each identified service; and displaying the average walk distance.

10. The method of claim 9, wherein determining a usage level comprises:

determining a user-type associated with the identified user; and assigning a usage level to the identified user based on the user-type associated with the identified user.

11. The method of claim 10, wherein determining a user-type comprises selecting a user-type based on one or more of the following:

a location associated with the identified user;
a department associated with the identified user;
a job type associated with the identified user; and
a job responsibility associated with the identified user.

12. The method of claim 9, wherein determining a usage level comprises:

determining a number of times the identified user accessed the identified service over a period of time.

13. The method of claim 9, wherein determining a usage level comprises projecting the usage level based on one or more of the following:

historical data associated with a user type corresponding to the identified user; and usage data associated with the identified user and the identified service.

14. The method of claim 9, wherein determining a distance between the identified user and the identified service comprises:

identifying a floor plan associated with the building;
converting the floor plan to a digital format;
annotating the converted floor plan to produce an annotated floor plan;
decomposing the annotated floor plan to produce a graph; and
determining a path between the identified user and the identified service using the graph.

15. The method of claim 14, wherein annotating the converted floor plan comprises correlating a set of position coordinates associated with the converted floor plan to one or more of the following:

a room number;
an exit;
a stairwell;
an elevator; and
a location associated with a resource.

16. The method of claim 14, wherein decomposing the annotated floor plan comprises:

partitioning the annotated floor plan into a plurality of rectangles, wherein the plurality of rectangles are not uniformly sized, wherein each rectangle in the plurality is associated with one or more position coordinates;

generating an adjacency list by determining one or more adjacent rectangles to each rectangle in the plurality; and generating a graph based on the adjacency list, wherein the graph comprises a plurality of vertices and a plurality of edges.

17. The method of claim 16, wherein determining a path comprises using the generated graph to determine the shortest path between the identified user and the identified service.

18. The method of claim 9, wherein:

a location associated with the identified user is on a first floor;

a location associated with the identified service is on a second floor; and determining a distance between the identified user and the identified service comprises:
determining a first distance between the location of the identified user and a first entrance to a vertical movement system, wherein the first entrance is located on the first floor,
determining a second distance between the first exit and a second entrance to the vertical movement system, wherein the second entrance is located on the second floor,
determining a third distance between the second exit and the location associated with the identified service, and
summing the first distance, the second distance and the third distance.

19. A method of determining an average walk distance for a plurality of users, the method comprising:

identifying a plurality of services in a facility, wherein each service is provided by one or more resources;

identifying a total number of users associated with the plurality of services;

for each identified user:
identifying one or more services used by the identified user,
for each identified service:
determining a usage level associated with the identified service and the identified user,
determining, by a computing device, a distance between the identified user and the identified service,
determining a first value by multiplying the usage level by the distance,
determining a second value by summing the first values associated with each identified service;

determining a third value by summing the second values associated with each identified user;

determining an average walk distance for the one or more users by dividing the third value by the total number of users; and displaying the average walk distance.

20. The method of claim 19, wherein determining a usage level comprises:
   determining a user-type associated with the identified user; and
   assigning a usage level to the identified user based on the user-type associated with the identified user.

21. The method of claim 19, wherein determining a usage level comprises one or more of the following:
   determining a number of times the identified user accessed the identified service over a period of time; and
   projecting the usage level based on one or more of the following:
      historical data associated with a user type corresponding to the identified user, and
      usage data associated with the identified user and the identified service.

22. The method of claim 19, wherein determining a distance between the identified user and the identified service comprises:
   identifying a floor plan associated with the building;
   converting the floor plan to a digital format;
   annotating the converted floor plan to produce an annotated floor plan;
   decomposing the annotated floor plan to produce a graph; and
   determining a path between the identified user and the identified service using the graph.

23. The method of claim 22, wherein decomposing the annotated floor plan comprises:
   partitioning the annotated floor plan into a plurality of rectangles, wherein the plurality of rectangles are not uniformly sized, wherein each rectangle in the plurality is associated with one or more position coordinates;
   generating an adjacency list by determining one or more adjacent rectangles to each rectangle in the plurality; and
   generating a graph based on the adjacency list, wherein the graph comprises a plurality of vertices and a plurality of edges.

24. The method of claim 22, wherein determining a path comprises using the generated graph to determine the shortest path between the identified user and the identified service.

25. The method of claim 19, wherein:
   a location associated with the identified user is on a first floor;
   a location associated with the identified service is on a second floor; and
   determining a distance between the identified user and the identified service comprises:
      determining a first distance between the location of the identified user and a first entrance to a vertical movement system, wherein the first entrance is located on the first floor,
      determining a second distance between the first exit and a second entrance to the vertical movement system, wherein the second entrance is located on the second floor,
      determining a third distance between the second exit and the location associated with the identified service, and
      summing the first distance, the second distance and the third distance.

* * * * *